United States Patent
Immel et al.

(10) Patent No.: US 7,165,698 B2
(45) Date of Patent: Jan. 23, 2007

(54) CONSTRUCTION FOR MULTI-LAYERED VACUUM SUPER INSULATED CRYOGENIC TANK

(75) Inventors: Rainer Immel, Mainz (DE); Martin Stadie, Langen (DE)

(73) Assignee: General Motors Corporation, Detroit, MI (US)

( * ) Notice: Subject to any disclaimer, the term of this patent is extended or adjusted under 35 U.S.C. 154(b) by 213 days.

(21) Appl. No.: 10/407,744

(22) Filed: Apr. 3, 2003

(65) Prior Publication Data

US 2004/0195246 A1  Oct. 7, 2004

(51) Int. Cl.
*F17C 1/12* (2006.01)
(52) U.S. Cl. .................................. 220/560.05
(58) Field of Classification Search ........... 220/560.05, 220/560.1, 560.11
See application file for complete search history.

(56) References Cited

U.S. PATENT DOCUMENTS 1,948,477 A * 2/1934 Zenner .................. 220/560.09
3,149,742 A * 9/1964 Duncan et al. ......... 220/560.13
3,155,265 A * 11/1964 Reese ..................... 220/560.05
3,347,402 A * 10/1967 Forman et al. .......... 220/560.1
3,941,272 A * 3/1976 McLaughlin ........... 220/560.11
4,098,425 A   7/1978 Yamamoto
5,012,948 A * 5/1991 Van Den Bergh ..... 220/560.05
5,130,193 A * 7/1992 Ikeda ......................... 428/365
5,174,079 A * 12/1992 Bambacigno et al. ......... 52/249
5,787,920 A   8/1998 Krasnov
6,354,321 B1  3/2002 Horst et al.

FOREIGN PATENT DOCUMENTS

DE       195 24 681       1/1997

* cited by examiner

*Primary Examiner*—Stephen Castellano
(74) *Attorney, Agent, or Firm*—Harness, Dickey & Pierce, P.L.C.

(57) ABSTRACT

A construction for a multi-layered vacuum super insulated cryogenic tank and a method for making the same is disclosed. The cryogenic tank uses an inner tank that is wrapped with multiple layers of radiation shielding and is suspended within a frame by one or more suspension members. The frame is enclosed within a fluid tight outer tank that fits snuggly against the frame. An ultra-high vacuum is created between the inner and outer tanks.

32 Claims, 2 Drawing Sheets

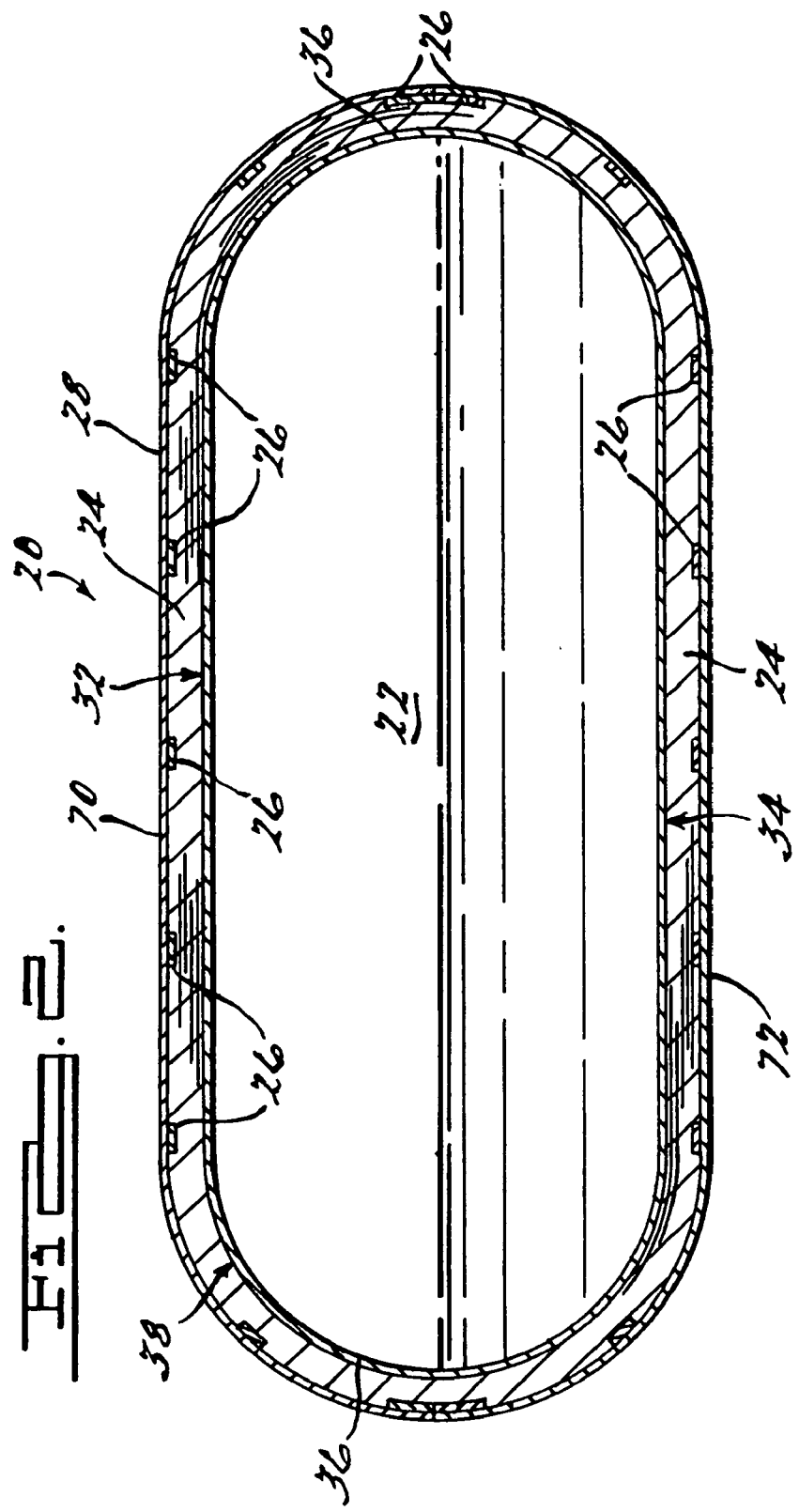

CONSTRUCTION FOR MULTI-LAYERED VACUUM SUPER INSULATED CRYOGENIC TANK

FIELD OF THE INVENTION

The present invention relates to storage tanks, and more specifically, to cryogenic storage tanks.

BACKGROUND OF THE INVENTION

Typical multi-layered vacuum super insulated cryogenic tanks utilize a pair of cylindrical inner and outer tanks that are arranged concentrically with the inner tank residing in an interior of the outer tank. There are multiple radiant heat shields, approximately 30–80, coiled around the inner tank between the inner and outer tanks. A high vacuum exists between the inner and outer tanks to further prevent heat transfer. This type of thermal insulation is called a multi-layered vacuum super insulation. These storage tanks are capable of storing fluids at cryogenic temperatures.

The inner tank is positioned within the outer tank so that the inner tank does not contact the outer tank and so that thermal conduction paths between the inner and outer tanks are minimized. To facilitate this positioning, the inner tank typically has a pair of closed end pipes welded on opposite ends of the inner tank that form closed end channels that extend into the interior of the inner tank. A pair of rods are positioned in the channels to support the inner tank within the outer tank. The rods are designed so that the only contact between the rods and the inner tank is the interface between the ends of the rods and the ends of the channels. Opposite ends of the rods are attached to the internal surface of the outer tank. The rods, positioned on opposite ends of the inner tank, thereby support the inner tank within the outer tank.

To minimize the conductive heat paths, the rods are made from a carbon or glass fiber or other composite material. The carbon and glass fibers provide low thermal conductivity and help to isolate the inner tank from the outer tank. To further reduce the possibility of heat conduction between the inner and outer tanks, the rods can be made longer. That is, the length that the channels extend into the interior cavity of the inner tank can be increased, which decreases the volume of the inner tank, to allow for longer rods to be employed without increasing the dimensions of the outer tank. However, as the rods get longer, the bending force on the rods increases and a larger diameter rod is required to support the load over the longer distance. This in turn requires a larger surface area for the contact between the rods and the inner tank which increases the amount of heat being conducted through the rods, thus there is a trade-off between the conduction caused by the length of the rod and the conduction caused by the increased surface area of the rods in contact with the ends of the channel to support the loading caused by the extended length. Accordingly, it would be advantageous to provide an apparatus for supporting the inner tank within the outer tank that has a minimal intrusion on the inner tank while also limiting the conductive heat paths between the inner and outer tanks.

With the advent of fuel cell technology and the inclusion of fuel cells on mobile platforms (i.e. vehicles), there is a need for an onboard hydrogen storage system. The space in which to provide for hydrogen storage on the mobile platforms is limited. Additionally, the available space may be irregular in shape. The typical cryogenic storage tanks, as discussed above, are cylindrical. The cylindrical shape is used because it provides for cancellations of the forces applied to/on the storage tank. However, the use of a cylindrical cryogenic tank on a mobile platform may not provide the most efficient use of the available space on the mobile platform. Accordingly, it would be advantageous to provide a cryogenic storage tank that is non-cylindrical in shape. Furthermore, it would be advantageous to provide a cryogenic storage tank that is capable of more closely conforming to the available space on the mobile platform to maximize the amount of fluid that can be stored in the cryogenic tank on the mobile platform within the available space.

SUMMARY OF THE INVENTION

The present invention provides a new construction for a multi-layered vacuum super insulated cryogenic tank. The construction suspends an inner tank inside an outer tank without the use of rods that intrude into the interior cavity of the inner tank. The construction allows for both cylindrical and non-cylindrical shapes for the inner and outer tanks.

A cryogenic storage tank according to the principles of the present invention includes a fluid tight inner tank operable to store a fluid. There is a frame surrounding the inner tank and the frame is spaced apart from the inner tank. A fluid tight outer tank surrounds the frame. A vacuum exists between the inner and outer tanks.

A method of manufacturing a cryogenic storage tank having an inner tank, a frame and an outer tank according to the principles of the present invention is disclosed. The method includes: (1) suspending the inner tank inside the frame; (2) positioning the frame inside the outer tank; and (3) producing a vacuum between the inner and outer tanks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a cross-sectional view of a multi-layered vacuum super insulated cryogenic tank according to the principles of the present invention.

DETAILED DESCRIPTION OF THE PREFERRED EMBODIMENT

Figure 1:
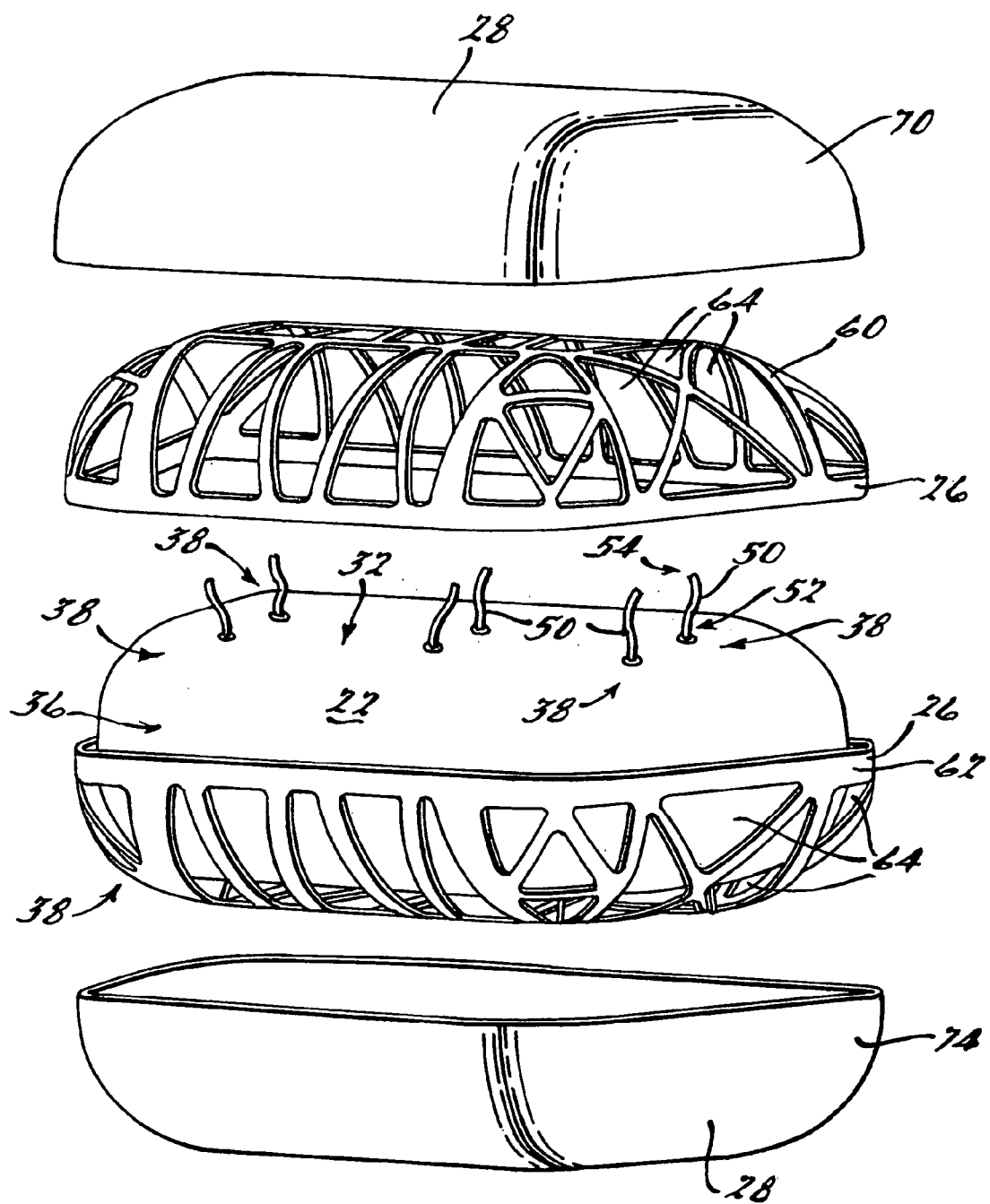
FIG. 1 is a simplified exploded view of a multi-layered vacuum super insulated cryogenic tank according to the principles of the present invention.

The following description of the preferred embodiment is merely exemplary in nature and is in no way intended to limit the invention, its application, or uses.

FIGS. 1 and 2 show a preferred embodiment of a multi-layered vacuum super insulated cryogenic tank 20 according to the principles of the present invention. Cryogenic tank 20 includes an inner tank 22 which is surrounded by one or more layers of insulation 24 (shown in FIG. 2 only) and suspended within a frame 26 such that inner tank 22 is spaced apart from and not in direct contact with frame 26. An outer tank 28 encases frame 26 along with insulation 24 and inner tank 22. There is a vacuum between inner tank 22 and outer tank 28. The vacuum is about $10^{-4}$ mbar which is also referred to as an ultra-high vacuum. The insulation 24 in conjunction with the ultra-high vacuum provides a multi-layer vacuum super insulation or MLVSI between inner and outer tanks 22 and 28.

Other components (not shown) include conduits for filling and emptying inner tank 22 as well as electrical leads for sensors. These other components are welded to inner tank 22 and outer tank 28 to provide fluid tight seals so that the ultra-high vacuum can be created between inner and outer tanks 22 and 28. These other components are similar to and attached in a similar manner to inner and outer tanks 22 and 28 as is conventionally known.

The construction of cryogenic tank 20 enables cryogenic tank 20 to take a non-cylindrical form. That is, cryogenic tank 20 (inner tank 22, frame 26 and/or outer tank 28), unlike prior art tanks, does not need to be cylindrical in shape to provide storage of fluids at cryogenic temperatures and to use a multi-layered vacuum super insulation to provide such low temperature storage. In addition to being non-cylindrical, cryogenic tank 20 can also be asymmetrical. With this ability, cryogenic tank 20 can be shaped and configured to correspond to an available space in which cryogenic tank 20 is to be located. The flexibility in the configuration allows for cryogenic tank 20 to be shaped to maximize the volume of fluid stored in cryogenic tank 20 within the space available. Further, inner tank 22, frame 26 and outer tank 28 may have similar or different shapes since all that is required is that inner tank 22 be nested in frame 26 and frame 26 be nested in outer tank 28. Insulation 24 is arranged to conform to the nested configuration.

Inner tank 22 can be provided in a variety of shapes, including non-cylindrical shapes, such as that shown in FIGS. 1 and 2. In the configuration illustrated, inner tank 22 has relatively flat opposite top and bottom surfaces 32 and 34 that are spaced apart by curved side wall 36. The joining of top and bottom surfaces 32 and 34 to side wall 36 produces a plurality of corners or corner portions 38. Inner tank 22 can also have a number of projections or attachment fixtures to facilitate suspending inner tank 22 within frame 26, as described below. Inner tank 22 is designed to store a fluid at cryogenic temperatures of less than 100° K. Preferably, inner tank 22 is capable of storing fluids at less than 30° K. Inner tank 22 stores the fluid at a pressure in the range of about 1 to 12 bars. Preferably, inner tank 22 stores the fluid at about 4 bars. Inner tank 22 can be used to store a variety of fluids. In a mobile application employing a fuel cell system, the fluid stored will be hydrogen.

To meet these functional requirements, inner tank 22 can be made from a variety of materials that are capable of withstanding the cryogenic temperatures experienced and the pressure differentials between the interior of inner tank 22 and the ultra-high vacuum between inner tank 22 and outer tank 28. Preferably, inner tank 22 is made from a metal, such as stainless steel, aluminum or an alloy of aluminum. The use of metal facilitates the sealing of the other components to inner tank 22. For example, the other components can be sealed to inner tank 22 by welding.

Inner tank 22, as stated above, is suspended within frame 26 such that inner tank 22 is not in direct contact with frame 26. To suspend inner tank 22 within frame 26, a plurality of suspension members 50 are used to support inner tank 22 within frame 26 without inner tank 22 being in direct contact with frame 26. Suspension members 50 can be attached to inner tank 22 in a variety of ways. For example, inner tank 22 can have a variety of projections, eyelets, or similar attachment fixtures to which suspension members 50 can be secured.

Suspension members 50 have opposite first and second ends 52 and 54. First end 52 of each suspension member 50 is secured to inner tank 22 while second end 54 of each suspension member 50 is secured to frame 26, as described below. The first ends 52 are attached to inner tank 22 along top and bottom surfaces 32 and 34, as shown in FIG. 1. The specific locations of the attachments of first ends 52 of suspension members 50 can vary depending upon the desired manner in which inner tank 22 is to be suspended within frame 26. For example, suspension members 50 can be spaced along top and bottom surfaces 32 and 34 adjacent side walls 36 to provide a generally uniform suspension of top and bottom surfaces 32 and 34 of inner tank 22 within frame 26. As can be seen, a suspension member 50 is located in each corner portion 38 of inner tank 22. It should be appreciated, however, that other arrangements and connection points of suspension members 50 to inner tank 22 can be employed without departing from the scope of the present invention.

Suspension members 50 are under tensile loading only and are preferably flexible to allow suspension members 50 to be attached to inner tank 22 and/or frame 26 at any of a variety of locations. Suspension members 50 are preferably filaments that have low thermal conductivity. The filaments can be either monofilaments or multifilaments. To provide for the low thermal conductivity, suspension members 50 are preferably made from a carbon fiber or glass fiber. However, other materials having low conductivity that are flexible can be employed without departing from the scope of the present invention. Suspension members 50 suspend inner tank 22 within frame 26 under tensile loading only and no compressive, shear or bending loading of suspension members 50 occurs. With the suspension members 50 being only under tensile loading, the length of suspension members 50 can be increased, to provide less heat conduction between inner tank 22 and frame 26, without increasing the cross sectional area of suspension members 50. In other words, if it is desired to double the length of suspension members 50 to provide a further distance between inner tank 22 and frame 26, the cross sectional area of suspension members 50 does not need to be increased and results in approximately a one-half reduction in the conduction of heat through suspension members 50.

The use of suspension members 50 on both the top and bottom surfaces 32 and 34 of inner tank 22 limit the movement or bouncing of inner tank 22 within cryogenic tank 20 due to movement or bouncing of the mobile platform on which cryogenic tank 20 is utilized. Suspension members 50 are designed to have a natural frequency that dampens inner tank 22 within cryogenic tank 20 to limit and/or prevent oscillations of inner tank 22.

Suspension members 50 are shown as being a plurality of suspension members 50 that suspend inner tank 22 within frame 26, however, it should be appreciated that a single suspension member 50 could be employed on each of the top and bottom surfaces 32 and 34. For example, a single suspension member 50 can be connected to a central location on top surface 32 of inner tank 22 and to a single location on frame 26 and a single suspension member 50 can be connected to a central location on bottom surface 34 of inner tank 22 and to a single location on frame 26 to suspend inner tank 22 within frame 26. Accordingly, the exact number of suspension members 50 used to suspend inner tank 22 within frame 26 can vary and will depend upon the desired design and functionality of cryogenic tank 20.

Insulation 24 in conjunction with the ultra-high vacuum provides a multi-layered vacuum super insulation, as is known in the art. Insulation 24 consists of a large number, approximately 30–80, of reflective foil thermal radiation shields, preferably made of aluminum, which are coiled or wrapped around inner tank 22. That is, because the primary cause of heat gain in inner tank 22 is due to thermal radiation, insulation 24 provides multiple layers of thermal radiation shielding to inhibit the influx of heat via radiation into inner tank 22. The insulation layers 24 can be provided as a single piece of insulation that is wrapped around inner tank 22, the other components, and suspension members 50. Alternatively, insulation layers 24 can be a plurality of individual sheets that are each wrapped around inner tank 22. The insulation layers 24 are wrapped around inner tank 22 until approximately 30–80 layers of insulation is obtained. This application technique is similar to that which is currently done and is therefore not discussed in further detail.

Frame 26, as shown in FIG. 1, consists of rigid top and bottom portions 60 and 62 that are attached together during the assembling of cryogenic tank 20. Top and bottom portions 60 and 62 can be attached together by a variety of means. For example, top and bottom portions 60 and 62 can be attached together by welding or mechanical fasteners. Top and bottom portions 60 and 62 are shaped to be complementary to inner tank 22 and to conform to the desired external configuration of cryogenic tank 20. Top and bottom portions 60 and 62 are dimensioned to allow sufficient space for insulation layers 24 and for the suspension of inner tank 22 within frame 26 without inner tank 22 being in direct contact with frame 26.

Both top and bottom portions 60 and 62 have a plurality of openings 64 that serve a variety of purposes. Openings 64 function to reduce the weight of frame 26 so that cryogenic tank 20 can be of a minimal weight while still meeting the operational performance requirements of cryogenic tank 20. Openings 64 also facilitate the assembly of cryogenic tank 20 by allowing access to inner tank 22, as described below. Furthermore, openings 64 allow the other components that are connected to inner tank 22 to pass through frame 26. The specific configuration of frame 26 and the locations, sizes and shapes of openings 64 are based on an intelligent design of frame 26 to provide the required support for cryogenic tank 20 while minimizing the weight of cryogenic tank 20. In the preferred embodiment, as shown, frame 26 is a triangulated frame that disburses loading on frame 26 throughout various portions to avoid concentration of forces in small areas.

Frame 26 functions to suspend inner tank 22 within frame 26. Accordingly, frame 26 and, more specifically, the attachment points for suspension members 50 to frame 26 are designed to provide the required support to suspend inner tank 22 within frame 26. As stated above, second ends 54 of suspension members 50 are attached to frame 26 to suspend inner tank 22 within frame 26. Suspension members 50 can be attached to frame 26 in a variety of manners. For example, projections or eyelets can be provided on frame 26 to secure second ends 54 of suspension members 50 to frame 26. Alternatively, second ends 54 of suspension members 50 can be passed through one or more openings 64 and tied to frame 26. Additionally, the location(s) on frame 26 where suspension members 50 are attached can also vary. Thus, suspension members 50 can be secured to frame 26 in a variety of ways and at a variety of locations.

In addition to suspending inner tank 22 within frame 26, frame 26 also serves to support outer tank 28 against the pressure differential between the ultra-high vacuum between inner and outer tanks 22 and 28 and the pressure external to cryogenic tank 20. In other words, outer tank 28 is pulled or sucked toward inner tank 22 as a result of the pressure differential between the ultra-high vacuum and the pressure of the environment within which cryogenic tank 20 is employed and frame 26 supports outer tank 28. Thus, frame 26 supports outer tank 28 and outer tank 28 acts as a skin over frame 26 that provides a fluid tight environment encasing frame 26 and inner tank 22. Because of the variations in the shapes of inner tank 22, the desired overall shape of cryogenic tank 20, and the variety of locations at which suspension members 50 can be used to suspend inner tank 22 from frame 26, frame 26 can take a variety of shapes, forms, and configurations based on the appropriate intelligent design of frame 26 to serve its intended purpose of suspending inner tank 22 and supporting outer tank 28.

To meet these functional requirements, frame 26 can be made from a variety of materials. For example, frame 26 can be made from metal such as stainless steel, aluminum or an alloy of aluminum. Preferably, frame 26 is made from the same material as inner tank 22 and outer tank 28. However, it should be appreciated that frame 26, can be made from other materials that have the appropriate temperature and strength characteristics to provide the functionality of frame 26 described above. Additionally, while frame 26 is shown as being comprised of top and bottom portions 60 and 64, frame 26 can be provided in any number of portions or pieces without departing from the scope of the present invention, however, not all of the benefits of the present invention may be realized.

Outer tank 28 has top and bottom portions 70 and 72 that are attached together during the assembly of cryogenic tank 20. Top and bottom portions 70 and 72 can be attached together in a variety of manners that provide a fluid tight outer tank 28 that is capable of sustaining a vacuum between inner and outer tanks 22 and 28. Preferably, top and bottom portions 70 and 72 are attached together by welding. Outer tank 28, like frame 26, can come in a variety of shapes depending upon the desired external configuration of cryogenic tank 20. Top and bottom portions 70 and 72 are configured to be complementary to the respective top and bottom portions 60 and 62 of frame 26 so that outer tank 28 is complementary to frame 26. Preferably, outer tank 28 is configured to fit snuggly or tightly against frame 26 with outer tank 28 in direct contact with frame 26. The use of frame 26 to support outer tank 28 enables outer tank 28 to be dimensioned (thickness) to allow outer tank 28 to deform inwardly against frame 26 as a result of the pressure differential between the ultra-high vacuum between inner and outer tanks 22 and 28 and the pressure of the environment within which cryogenic tank 20 is located. With the outer tank 28 deforming as a result of the pressure differential, frame 26 serves to support outer tank 28 against the force of the pressure differential, as discussed above. While outer tank 28 is shown as being comprised of top and bottom portions 70 and 72, outer tank 28 can be provided in any number of portions or piece without departing from the scope of the present invention.

Outer tank 28 can be made from a variety of materials. Preferably, outer tank 28 is metallic and made from the same material as inner tank 22. Specifically, outer tank 28 is preferably made from stainless steel, aluminum, or an alloy of aluminum. By making outer tank 28 and inner tank 22 of the same material, the welding of the other components to inner and outer tanks 22 and 28 is simplified.

The construction of cryogenic tank 20 improves the assembly of cryogenic tank 20 over that of typical cryogenic tanks. To assemble cryogenic tank 20, inner tank 22 is first constructed. The other components are then welded to inner tank 22 to provide a fluid tight seal between the other components and the interior of inner tank 22. One or more suspension members 50 are then attached to inner tank 22 at the desired attachment locations as dictated by the design of cryogenic tank 20. With the other components and suspension members 50 attached to inner tank 22, insulation layers 24 can then be applied to inner tank 22. Specifically, the insulation layers are wrapped around inner tank 22, as is known in the art. One of the portions of frame 26 can then be positioned on or adjacent inner tank 22 with the other components welded to inner tank 22 passing through one or more openings 64. The second ends 54 of suspension members 50 are then attached to the appropriate attachment locations on the portion of frame 26. Openings 64 in frame 26 facilitate this assembly by allowing a worker or machine assembling cryogenic tank 20 to reach through one or more of the openings 64 to grab suspension members 50 and secure suspension members 50 to frame 26. As stated above, second end 54 of suspension members 50 can be passed through one or more openings 64 and tied to frame 26 or secured to an attachment fixture. The portion of frame 26 to which inner tank 22 is now connected can then be elevated to suspend inner tank 22 from that portion of frame 26. The other portion(s) of frame 26 can then be mated to the portion of frame 26 already connected to inner tank 22 by suspension members 50. The top and bottom portions 60 and 62 of frame 26 can then be secured together by welding or other means as discussed above. With frame 26 secured, the opposite side of inner tank 22 can then be secured to the other portion(s) of frame 26 via suspension members 50 located on the opposite side of inner tank 22. Thus, inner tank 22 is now completely suspended within frame 26 by suspension members 50.

With top and bottom portions 60 and 62 of frame 26 secured to one another and inner tank 22 suspended within frame 26, frame 26 is then placed in either top or bottom portion 70 and 72 of outer tank 28. The other portion of outer tank 28 is then positioned over frame 26. When positioning top and bottom portions 70 and 72 of outer tank 28 on frame 26, the other components extending from inner tank 22 pass through complementary opening(s) (not shown) in outer tank 28. The two portions of outer tank 28 are then connected together by welding and the other components sealed to outer tank 28 by welding. The welding of top and bottom portions 70 and 72 of outer tank 28 and of the other components to outer tank 28 provides a fluid tight outer tank 28 that is capable of sustaining a vacuum between inner tank 22 and outer tank 28. With the cryogenic tank 20 now assembled, an ultra-high vacuum can then be created between inner and outer tanks 22 and 28, via a variety of methods known in the art. The creation of the ultra-high vacuum between inner and outer tanks 22 and 28 may cause outer tank 28 to deform inwardly toward frame 26 wherein outer tank 28 is supported by frame 26 against the pressure differential between the ultra-high vacuum and the pressure external of cryogenic tank 20. With the assembly of cryogenic tank 20 now complete, cryogenic tank 20 can be employed in a desired application.

Thus, a cryogenic tank 20 according to the principles of the present invention provides for easier assembly and a better utilization of space by being capable of providing cryogenic storage of a fluid in a non-cylindrical configuration. Additionally, cryogenic tank 20 can be of a lower cost due to the ease of manufacturing and have a reduced weight due to the intelligent design of frame 26 and the use of weight saving openings 64. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cryogenic storage tank comprising:
a fluid tight inner tank operable to store a fluid;
a frame extending around all sides of said inner tank, said frame being spaced apart from said inner tank;
a fluid tight outer tank surrounding said frame; and
a vacuum between said inner and outer tanks.

2. The storage tank of claim 1, further comprising at least one flexible suspension member, said suspension member being connected to said inner tank and connected to said frame, and said suspension member suspending said inner tank within said frame.

3. The storage tank of claim 2, wherein said at least one suspension member is under tensile force when suspending said inner tank within said frame.

4. The storage tank of claim 2, wherein said at least one suspension member is a filament.

5. The storage tank of claim 2, wherein said at least one suspension member is made from at least one of carbon fiber and glass fiber.

6. The storage tank of claim 2, wherein said at least one suspension member is a plurality of suspension members and said suspension members are attached to corners of said inner tank.

7. The storage tank of claim 1, wherein said frame includes at least two members that are connected together to form said frame and to surround said inner tank.

8. The storage tank of claim 7, wherein said at least two members are welded together.

9. The storage tank of claim 1, wherein said outer tank includes at least two members that are connected together to form said outer tank and to surround said frame.

10. The storage tank of claim 9, wherein said at least two members are welded together.

11. The storage tank of claim 1, wherein said frame has a plurality of openings.

12. The storage tank of claim 11, wherein said inner tank and said frame are arranged to provide access to said inner tank through at least one of said openings.

13. The storage tank of claim 1, wherein said inner tank, said frame and said outer tank are non-cylindrical in shape.

14. The storage tank of claim 1, further comprising at least one layer of insulation between said inner tank and said frame.

15. The storage tank of claim 1, wherein said frame is in direct contact with said outer tank.

16. The storage tank of claim 1, wherein said frame is shaped to be complementary to a shape of an entirety of said inner tank.

17. The storage tank of claim 1, wherein said frame supports said outer tank against said vacuum between said inner and outer tanks.

18. The storage tank of claim 1, wherein said outer tank is contoured to be complementary to said frame so that said outer tank fits tightly against said frame.

19. The storage tank of claim 1, wherein said inner and outer tanks are made from at least one of stainless steel, aluminum and an alloy of aluminum.

20. The storage tank of claim 1, wherein said inner tank is operable to store a fluid at less than about 30° K.

21. The storage tank of claim 1, wherein said frame is nested in said outer tank.

22. The storage tank of claim 1, wherein said outer tank is free of attachment to said inner tank.

23. A cryogenic storage tank comprising:
a fluid tight inner tank operable to store a fluid;
a frame surrounding at least a portion of said inner tank, said frame being spaced apart from said inner tank;
a fluid tight outer tank disposed outside of said frame; and
a vacuum between said inner and outer tanks,
wherein said outer tank is deformed against said frame by said vacuum between said inner and outer tanks.

24. A cryogenic storage tank comprising:
an inner tank operable to store a fluid;
a frame surrounding an entirety of said inner tank;
at least one flexible suspension member connected to said inner tank and connected to said frame, said at least one suspension member suspending said inner tank inside said frame;
an outer tank surrounding said frame;
a vacuum between said inner and outer tank; and
wherein at least one of said inner tank, frame, and outer tank is non-cylindrical.

25. The storage tank of claim 24, wherein said at least one suspension member is a filament.

26. The storage tank of claim 24, wherein said at least one suspension member is made from at least one of carbon fiber and glass fiber.

27. The storage tank of claim 24, wherein said frame has a plurality of openings.

28. The storage tank of claim 24, wherein said inner tank is operable to store a fluid at less than about 30°K.

29. The storage tank of claim 24, wherein said outer tank is deformed against said frame by said vacuum.

30. The storage tank of claim 24, wherein said frame is spaced apart from said inner tank.

31. A cryogenic storage tank comprising:
a fluid tight inner tank operable to store a fluid;
a frame surrounding at least a portion of said inner tank, said frame being spaced apart from said inner tank;
a plurality of suspension members suspending said inner tank from and within said frame;
a fluid tight outer tank disposed outside of said frame; and
a vacuum between said inner and outer tanks,
wherein a suspension force imparted on said frame by said suspension members is borne entirely by said frame.

32. A cryogenic storage tank comprising:
a fluid tight inner tank operable to store a fluid;
a frame surrounding at least a portion of said inner tank, said frame being spaced apart from said inner tank;
a fluid tight outer tank disposed outside of said frame;
at least one flexible suspension member, said suspension member being connected to said inner tank and connected to said frame, and said suspension member suspending said inner tank within said frame; and
a vacuum between said inner and outer tanks,
wherein said inner tank has relatively flat opposite top and bottom surfaces and said at least one suspension member is a plurality of suspension members spaced about said top and bottom surfaces of said inner tank.

* * * * *